(12) United States Patent
Takaku

(10) Patent No.: US 8,667,228 B2
(45) Date of Patent: Mar. 4, 2014

(54) MEMORY SYSTEM AND METHOD FOR CONTROLLING MEMORY SYSTEM

(75) Inventor: Kazuya Takaku, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 162 days.

(21) Appl. No.: 13/418,432

(22) Filed: Mar. 13, 2012

(65) Prior Publication Data

US 2012/0173826 A1 Jul. 5, 2012

Related U.S. Application Data

(63) Continuation of application No. PCT/JP2009/004886, filed on Sep. 25, 2009.

(51) Int. Cl.
*G06F 12/16* (2006.01)
*G06F 13/40* (2006.01)
*G06K 5/04* (2006.01)

(52) U.S. Cl.
USPC ............................ 711/148; 711/162; 714/699

(58) Field of Classification Search
None
See application file for complete search history.

(56) References Cited

U.S. PATENT DOCUMENTS

| 4,438,494 A | 3/1984 | Budde et al. | |
|---|---|---|---|
| 2001/0030942 A1* | 10/2001 | Suzuki | 370/228 |
| 2002/0027908 A1* | 3/2002 | Kalkunte et al. | 370/389 |
| 2002/0087751 A1* | 7/2002 | Chong, Jr. | 710/33 |
| 2003/0101314 A1 | 5/2003 | Piccirillo et al. | |
| 2008/0046629 A1 | 2/2008 | Itozawa et al. | |
| 2008/0052454 A1* | 2/2008 | Bullen et al. | 711/109 |

FOREIGN PATENT DOCUMENTS

| EP | 1132815 | 9/2001 |
|---|---|---|
| EP | 1890239 | 2/2008 |
| JP | 8-16484 | 1/1996 |
| JP | 9-6737 | 1/1997 |
| JP | 2006-39897 | 2/2006 |
| JP | 2008-46996 | 2/2008 |

OTHER PUBLICATIONS

International Search Report, PCT/ISA/210, of PCT/JP2009/004886 mailed Jun. 22, 2010.
Extended European Search Report mailed Nov. 30, 2012, issued in corresponding European Patent Application No. 09849758.9.

* cited by examiner

*Primary Examiner* — Than Nguyen
(74) *Attorney, Agent, or Firm* — Staas & Halsey LLP

(57) ABSTRACT

A memory system connected to another apparatus via a data crossbar, has a first memory, a second memory that forms a dual configuration together with the first memory, a first memory controller that transmits or receives data to be written into the first memory or data read out from the first memory to or from the other apparatus, a second memory controller that transmits or receives data to be written into the second memory or data read out from the second memory to or from the other apparatus, and a system controller that instructs the first memory controller and the second memory controller to read out, from the first memory and the second memory, data requested to be read out by the other apparatus if the system controller detects that any one of the first data crossbar and the second data crossbar being not capable of transmitting or receiving data.

6 Claims, 8 Drawing Sheets

MEMORY SYSTEM AND METHOD FOR CONTROLLING MEMORY SYSTEM

CROSS-REFERENCE TO RELATED APPLICATION

This is a continuation of Application PCT/JP2009/004886 filed on Sep. 25, 2009, the entire contents of which are incorporated herein by reference.

FIELD

The present art relates to a memory system and a method for controlling a memory system.

BACKGROUND

A memory system includes system boards, and data crossbars and address crossbars for connecting the system boards. Each of the system boards includes a central processing unit (CPU), a memory, a system controller, and a memory controller. Some memory systems include memories and memory controllers in a dual configuration provided on a system board. The memory controllers in a dual configuration on the system board are connected to memory controllers of another system board via different data crossbars. The memories in a dual configuration store the same data, thereby storing data redundantly.

During a normal operation, when memory controllers in a dual configuration receive, from another system board, a request for reading out data, the memory controllers read out data from memories connected to the respective memory controllers in response to the request. Each of the memory controllers transfers the read out data to a memory controller of the other system board via a data crossbar.

A memory system performs a degraded operation if one of data crossbars breaks down. In the degraded operation, a memory controller connected to a data crossbar that has not broken down reads out data and transfers the read out data to a memory controller of another system board. During the degraded operation, if the data read out by the memory controller connected to the data crossbar that has not broken down has an uncorrectable error, the system board that receives the transferred data is incapable of using the data (see, for example, Japanese Laid-open Patent Publication No. 09-006737, Japanese Laid-open Patent Publication No. 2006-039897, Japanese Laid-open Patent Publication No. 2008-046996).

SUMMARY

According to an aspect of an embodiment, a memory system that is connectable to another apparatus via a data crossbar and that stores data, has a first memory that stores data, a second memory that forms a dual configuration together with the first memory and that stores data, a first memory controller that writes data into or reads out data from the first memory, that is connected to another apparatus via a first data crossbar, and that transmits or receives data to be written into the first memory or data read out from the first memory to or from the other apparatus, a second memory controller that writes data into or reads out data from the second memory, that is connected to the other apparatus via a second data crossbar, and that transmits or receives data to be written into the second memory or data read out from the second memory to or from the other apparatus, and a system controller that detects transmission or reception of data performed via the first data crossbar and the second data crossbar, that instructs the first memory controller and the second memory controller to read out, from the first memory and the second memory, data requested to be read out by the other apparatus if the system controller detects that any one of the first data crossbar and the second data crossbar being not capable of transmitting or receiving data, that performs error detection on data read out by the first memory controller and the second memory controller, and that outputs data in which no error has been detected or data in which an error has been corrected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
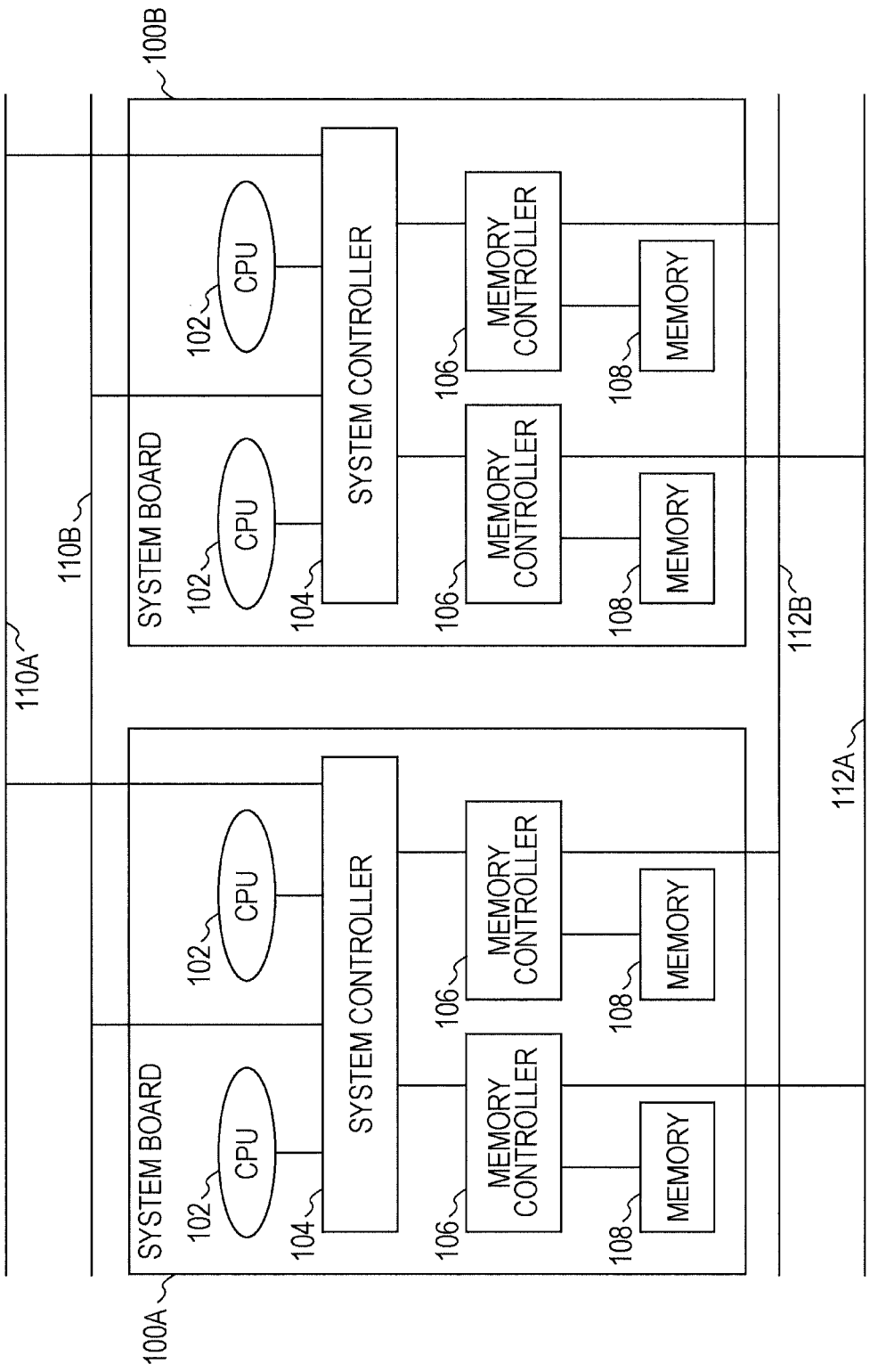
FIG. 1 is a diagram illustrating a configuration of an information processing apparatus.

An information processing apparatus according to the embodiment will be described with reference to FIG. 1. In the description given below, common elements are denoted by common reference numerals, for example, "102" and "108". An information processing apparatus 0 includes system boards 100A and 100B, address crossbars 110A and 110B, and data crossbars 112A and 112B. The address crossbars 110A and 110B and the data crossbars 112A and 112B connect a plurality of system boards. The address crossbars 110A and 110B perform transmission/reception of an address between the system board 100A and the system board 100B. The data crossbars 112A and 112B perform transmission/reception of data between the system board 100A and the system board 100B. The data crossbars 112A and 112B are directly connected to memory controllers included in the system boards, and the speed with which a memory is accessed is increased.

Each of the system board 100A and the system board 100B includes central processing units (CPUs) 102, a system controller 104, memory controllers 106, and memories 108. In each system board 100, the memory controllers 106 and the memories 108 form a dual configuration. Each of the memory controllers 106 reads out data from and writes data into the corresponding memory 108. The memory controllers in a dual configuration on the same system board are connected to different crossbars. The same data is written into the individual memories 108 in a dual configuration, and data redundancy is realized accordingly. A dual inline memory module (DIMM) is used as the memories 108, for example. Each of the CPUs 102 processes data. The system controller 104 performs synchronous control on the memory controllers 106 in a dual configuration.

The memory controllers 106 operate in synchronization with each other, and the memories 108 operate in synchronization with each other. However, the memory controllers themselves do not observe each other's operation so as to operate in synchronization with each other, but rather receive an instruction from a certain system controller 104 so as to constantly operate in synchronization with each other. If the data crossbar 112A or 112B breaks down, an instruction from the system controller 104 in another system board is not supplied to one side in a dual configuration. As a result, synchronization of the memory controllers 106 and the memories 108 is not realized. For this reason, degradation is performed, including a memory system that has not broken down. Simply copying the content of one of the memories to effectively utilize a usable memory system causes the two memories to operate separately, that is, to perform read and write, and a synchronized operation is not realized.

Figure 2:
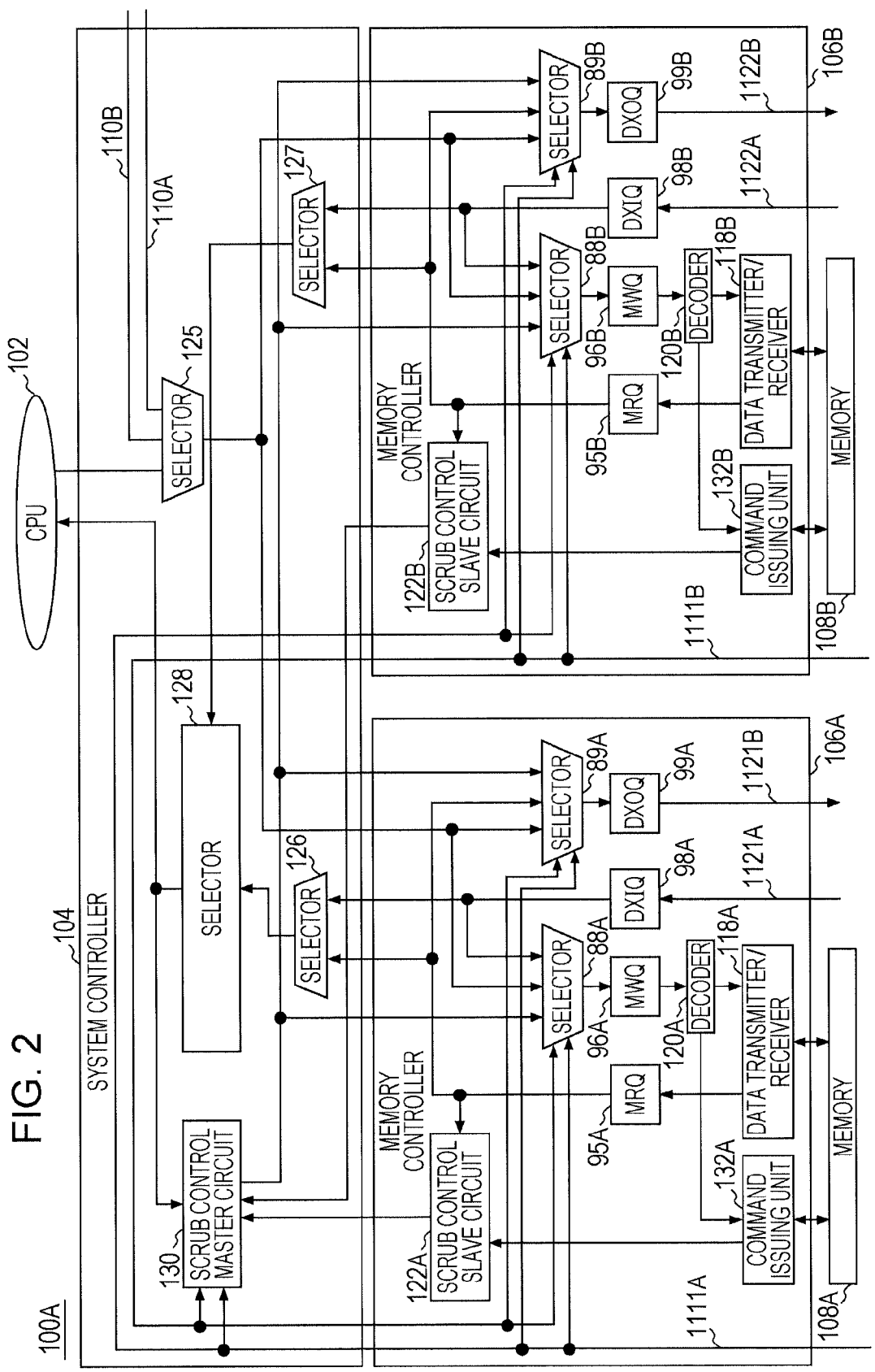
FIG. 2 is a diagram illustrating the information processing apparatus according to an embodiment.

The details of the system board 100A and the system board 100B will be further described with reference to FIG. 2. The configuration of the system board 100A is the same as the configuration of the system board 100B, and thus description will be given of the system board 100A. The two memory controllers 106 of the system board 100A described above with reference to FIG. 1 will be described by distinguishing them from each other as memory controllers 106A and 106B.

The memory controller 106A includes a data Xbar in queue (DXIQ) 98A, a data Xbar out queue (DXOQ) 99A, a selector 88A, a selector 89A, a memory write queue (MWQ) 96A, a memory read queue (MRQ) 95A, a decoder 120A, a data transmitter/receiver 118A, a command issuing unit 132A, and a scrub control slave circuit 122A.

The DXIQ 98A is a queue for storing data. The DXIQ 98A stores data that is transmitted from another system board via a signal line 1121A. The DXIQ 98A outputs the data stored therein to the selector 88A and a selector 126. The selector 88A selects a path on an input side connected to the selector 88A, and outputs data input through the selected path. When selecting the path connected to the DXIQ 98A, the selector 88A outputs the data outputted from the DXIQ 98A to the MWQ 96A. The MWQ 96A is a queue for storing data to be written into a memory and/or a command/address related to access to the memory. The MWQ 96A outputs the data outputted from the selector 88A to the decoder 120A. Also, the selector 88A appropriately selects an address and a command outputted from another system board via a signal line connected to an address crossbar and a selector 125 of the system controller 104, and outputs the address and command to the MWQ 96A. The MWQ 96A outputs the address and command outputted from the selector 88A to the decoder 120A.

The decoder 120A decodes data or the like outputted from the selector 88A. If an input command is a write command, the decoder 120A outputs the command and address to the command issuing unit 132A. Also, the decoder 120A outputs the data to the data transmitter/receiver 118A.

The command issuing unit 132A has a function of outputting a command decoded by the decoder 120A to a memory 108A. The command issuing unit 132A outputs a write command to the memory 108A on the basis of the data outputted from the decoder 120A. The data transmitter/receiver 118A has a function of transmitting data to and receiving data from the memory 108A. If a write command is issued by the command issuing unit 132A, the data transmitter/receiver 118A outputs the data to the memory 108A.

The memory 108A stores data. Upon receiving a write command outputted from the command issuing unit 132A, the memory 108A writes the data outputted from the data transmitter/receiver 118A into the address outputted from the command issuing unit 132A.

At the time of reading data in response to a read access from another system board, data is not inputted into the memory controller 106A via the signal line 1121A, but an address and a read command from the other system board supplied via the address crossbar 110 are inputted into the decoder 120A via the selector 125 and so forth.

If a received command is a read command, the decoder 120A outputs the read command and an address to the command issuing unit 132A. The command issuing unit 132A outputs the read command and address outputted from the decoder 120A to the memory 108A.

Upon receiving the read command outputted from the command issuing unit 132A, the memory 108A outputs the data stored in the address outputted from the command issuing unit 132A to the data transmitter/receiver 118A.

The data transmitter/receiver 118A receives the data outputted from the memory 108A at the execution of the read command. The data transmitter/receiver 118A outputs the data outputted from the memory 108A to the MRQ 95A. The MRQ 95A outputs the data outputted from the data transmitter/receiver 118A to the scrub control slave circuit 122A, the selector 89A, and the selector 126 of the system controller 104. The selector 126 will be described below.

The scrub control slave circuit 122A has a function of detecting an error in received data. The scrub control slave circuit 122A receives the data outputted from the MRQ 95A. The scrub control slave circuit 122A detects an error in the received data using an error correcting code (ECC). When detecting an error in the received data, the scrub control slave circuit 122A outputs a signal indicating that an error in the data has been detected to a scrub control master circuit 130. The scrub control master circuit 130 will be described below.

The selector 89A outputs, in a normal state, the data outputted from the MRQ 95A to the DXOQ 99A. The DXOQ 99A stores the data outputted from the selector 89A. The DXOQ 99A outputs the data stored therein to another system board via the output data crossbar 112B.

The system controller 104 includes the selector 125, the selector 126, a selector 127, a selector 128, and the scrub control master circuit 130.

The selector 125 outputs an address and command received from another system board via the address crossbar 110, or an address and command outputted from the CPU 102 to the selector 88A of the memory controller 106A and a selector 88B of the memory controller 106B.

The selector 126 selects any of the data outputted from the DXIQ 98A of the memory controller 106A and the data outputted from the MRQ 95A of the memory controller 106A, and outputs the selected data to the selector 128. Likewise, the selector 127 selects any of the data outputted from a DXIQ 98B of the memory controller 106B and the data outputted from an MRQ 95B of the memory controller 106B, and outputs the selected data to the selector 128.

The selector 128 performs error detection on the data outputted from the selector 126 and the data outputted from the selector 127 using an ECC. The selector 128 selects the data in which no error has been detected, and outputs the data to the CPU 102 and the scrub control master circuit 130.

A signal line 1111A and a signal line 1111B are connected to the selector 88A of the memory controller 106A. The signal line 1111A is connected to a correctable error detector 1091A of the data crossbar 112A. The signal line 1111B is connected to a correctable error detector 1092A of the data crossbar 112B. The correctable error detectors 1091A and 1092A will be described below with reference to FIG. 3.

If no signal is inputted into the selector 88A via the signal line 1111A from the data crossbar connected to the memory controller in which the selector 88A is mounted, the selector 88A nullifies the path from the DXIQ 98A to the selector 88A.

The signal line 1111A and the signal line 1111B are also connected to the scrub control master circuit 130 of the system controller 104. When signals are inputted from the respective signal lines, the scrub control master circuit 130 does not receive data or the like. When a signal is not inputted into the selector 88 from any one of the signal lines, the scrub control master circuit 130 receives data or the like from the selector 128.

Figure 3:
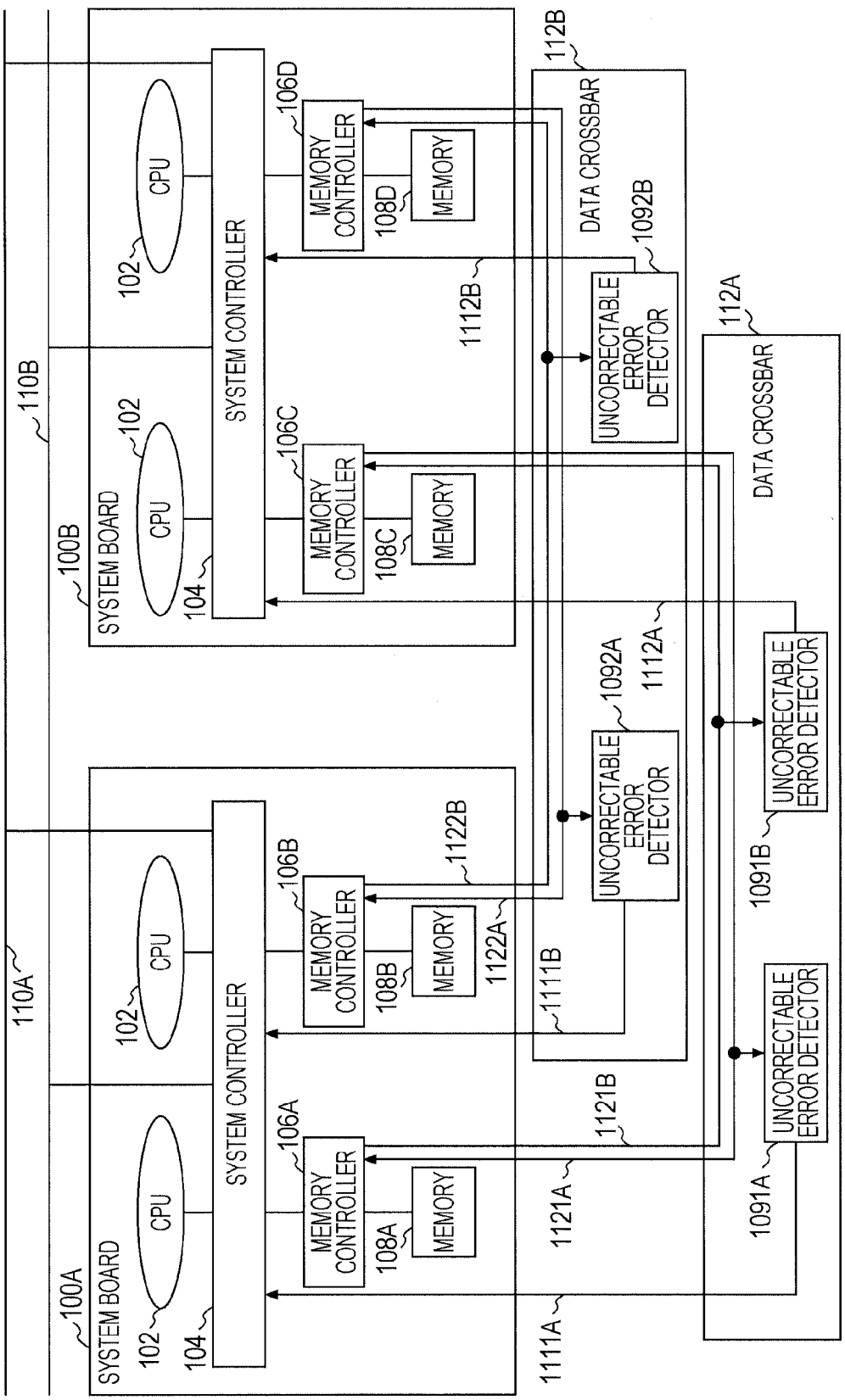
FIG. 3 is a diagram illustrating the details of data crossbars.

When the data crossbar 112B illustrated in FIG. 3 breaks down and when the memory system is performing a degraded operation, the data inputted from the data crossbar 112A via the memory controller 106A is inputted into the scrub control master circuit 130 via the selector 126 and the selector 128.

Now, a scrub write operation will be described. The scrub write operation is an operation in which the memory controller 106 reads out data from the memory 108, reads out data from an address of the memory 108 in which the data had been written if the read out data has a correctable error, corrects the error, and writes the corrected data to the same address of the memory 108 again. In this embodiment, description will be given of a case where the data read out from the memory 108A by the memory controller 106A has a correctable error.

If the scrub control slave circuit 122A of the memory controller 106A determines, using an ECC, that the data outputted from the MRQ 95A has an error, the scrub control slave circuit 122A transmits a scrub write request to the scrub control master circuit 130 provided in the system controller 104. Also, the scrub control slave circuit 122A of the memory controller 106A receives, from the command issuing unit 132A of the memory controller 106A, the address of the memory 108A in which data having an error had been stored. The scrub control slave circuit 122A of the memory controller 106A outputs the address received from the command issuing unit 132 to the scrub control master circuit 130.

Upon receiving the scrub write request and the address from the scrub control slave circuit 122A of the memory controller 106A, the scrub control master circuit 130 starts scrub write. The scrub control master circuit 130 outputs, to the selector 88A of the memory controller 106A and the selector 88B of the memory controller 106B, a scrub write command and the address received from the scrub control slave circuit 122A of the memory controller 106A. The selector 88 of each memory controller 106 outputs the scrub write command and address outputted from the scrub control master circuit 130 to the MWQ 96. The MWQ 96 stores the scrub write command and address outputted from the selector 88. Also, the MWQ 96 outputs the scrub write command and address stored therein to the decoder 120.

The decoder 120 decodes the scrub write command and address outputted from the MWQ 96, and outputs the scrub write command and address to the command issuing unit 132.

The command issuing unit 132 outputs the scrub write command and address outputted from the decoder 120 into the memory 108.

Upon receiving the scrub write command outputted from the command issuing unit 132, the memory 108 outputs the data stored in the address outputted from the command issuing unit 132 to the data transmitter/receiver 118.

The data transmitter/receiver 118 receives the data outputted from the memory 108. The data transmitter/receiver 118A of the memory controller 106A outputs the data outputted from the memory 108A to the selector 126 via the MRQ 95A. The selector 126 outputs the data received from the data transmitter/receiver 118A to the selector 128. A similar process is performed in the memory controller 106B, for example, the data transmitter/receiver 118B outputs data to the selector 127.

The selector 128 performs error correction, using an ECC, on the data from the memory controller 106A received from the selector 126 and the data from the memory controller 106B received from the selector 127. The selector 128 outputs the individual pieces of corrected data to the scrub control master circuit 130. The selector 128 selects and outputs normal data.

The scrub control master circuit 130 outputs the corrected data received from the selector 128, and the addresses and write commands received from the scrub control slave circuit 122A of the memory controller 106B and the scrub control slave circuit 122B of the memory controller 106B, respectively, to the selector 88A of the memory controller 106A and the selector 88B of the memory controller 106B. The write command is generated by the scrub control master circuit 130.

The selector 88 of each memory controller 106 outputs the data, address, and write command received from the scrub control master circuit 130 to the decoder 120 via the MWQ 96. The decoder 120 decodes the data and so forth received from the MWQ 96, and outputs the data to the data transmitter/receiver 118 and the address and write command to the command issuing unit 132.

The command issuing unit 132 outputs the write command and address outputted from the decoder 120 to the memory 108. The data transmitter/receiver 118 outputs the data outputted from the decoder 120 to the memory 108.

Upon receiving the write command outputted from the decoder 120, the memory 108 writes the data outputted from the data transmitter/receiver 118 to the address outputted from the decoder 120. A similar process is performed in the memory controller 106B. The scrub write operation is completed. With this operation, data having an error is corrected.

Next, a degradation operation of the memory system will be described. In this embodiment, description will be given of a case where the data crossbar 112B illustrated in FIG. 3 breaks down. Here, description will be given of memory reading.

If the data crossbar 112B illustrated in FIG. 3 breaks down, no signal is inputted into the scrub control master circuit 130 through the signal line 1111B. Thus, the data read out from the memory 108A is not directly transmitted to the DXOQ 99A, but is transmitted to the scrub control master circuit 130 via the selector 126 and the selector 128. Here, if no signal is inputted into the scrub control master circuit 130 through the signal line 1111B, selection of the path from the MRQ 95B to the selector 89B is nullified.

The scrub control master circuit 130 broadcasts data to the selector 89A of the memory controller 106A and the selector 89B of the memory controller 106B. Then, the data is outputted from the selector 89A of the memory controller 106A to another system board via a signal line 1121B. The reason why data is not outputted to the DXOQ 99B in the memory controller 106B is that no signal is inputted through the signal line 1111B and that the selector 89B does not select the path of the DXOQ 99B.

The write data outputted from another system board is inputted into the scrub control master circuit 130 via the signal line 1121A, the DXIQ 98A, the selector 126, and the selector 128 through the data crossbar 112A that is not broken.

Now, detection of the breakdown of a data crossbar will be described with reference to FIG. 3. The elements described above with reference to FIGS. 1 and 2 are denoted by the same reference numerals, and the description thereof is omitted.

The data crossbar 112A includes the uncorrectable error detector 1091A and an uncorrectable error detector 1091B. The data crossbar 112B includes the uncorrectable error detector 1092A and an uncorrectable error detector 1092B. The uncorrectable error detector 1091A detects, using an ECC, whether or not the data flowing though the signal line 1121A has an uncorrectable error. If the data does not have an uncorrectable error, the uncorrectable error detector 1091A inputs an alive signal into the selector 88A of the memory controller 106A and the scrub control master circuit 130 of the system controller 104 via the signal line 1111A. The alive signal is a signal for notifying the system board 100A that the data crossbar 112a is normally operating. On the other hand, if the data has an uncorrectable error, the uncorrectable error detector 1091A does not output an alive signal via the signal line 1111A. The selector 88A of the memory controller 106A and the scrub control master circuit 130 may switch a path in accordance with whether or not an alive signal is inputted from the uncorrectable error detector 1091A.

Likewise, the uncorrectable error detector 1092A detects, using an ECC, whether or not the data flowing though the signal line 1122A has an uncorrectable error. If the data does not have an uncorrectable error, the uncorrectable error detector 1092A inputs an alive signal into the selector 88B of the memory controller 106B and the scrub control master circuit 130 via the signal line 1111B. On the other hand, if the data has an uncorrectable error, the uncorrectable error detector 1092A does not input an alive signal into the selector 88B and the scrub control master circuit 130 via the signal line 1111B. The selector 88B of the memory controller 106B and the scrub control master circuit 130 may switch a path in accordance with whether or not an alive signal is inputted from the uncorrectable error detector 109B.

The uncorrectable error detector 1091B detects whether or not the data flowing through the signal line 1121B has an uncorrectable error, and determines whether or not to input an alive signal via the signal line 1112A. The uncorrectable error detector 1092B detects whether or not the data flowing through the signal line 1122B has an uncorrectable error, and determines whether or not to input an alive signal via the signal line 1112B.

Referring back to FIG. 2, writing data will be described first. Here, description will be given of a situation where the data crossbar connected to the memory controller 106B is broken. The DXIQ 98A stores data that is received from another system board via the signal line 1121A. The DXIQ 98A outputs the data stored therein to the selector 126. The individual elements described here are the elements on the 106A side. The selector 126 outputs the data outputted from the DXIQ 98A to the selector 128. The selector 128 outputs the data outputted from the selector 126 to the scrub control master circuit 130. The memory controller 106B does not receive data from another system board, and thus no data is inputted into the selector 128 via the selector 127.

The scrub control master circuit 130 outputs the data outputted from the selector 128 to the selector 88A of the memory controller 106A and the selector 88B of the memory controller 106B. The selector 125 outputs a write command and an address received from another system board via the address crossbar 110A or 110B to the selector 88A of the memory controller 106A and the selector 88B of the memory controller 106B. The memory controller 106A and the memory controller 106B perform processes similar to each other. Thus, in this embodiment, description will be given of the process performed by the memory controller 106A, and a description of the process performed by the memory controller 106B is omitted.

The selector 88A outputs the data received from the scrub control master circuit 130 and the write command and address received from the selector 125 to the MWQ 96A. The MWQ 96A outputs the data, write command, and address outputted from the selector 88A to the decoder 120A.

The decoder 120A decodes the data, write command, and address outputted from the MWQ 96A. The decoder 120A outputs the write command and address to the command issuing unit 132A. The decoder 120A outputs the data to the data transmitter/receiver 118A.

The command issuing unit 132A outputs the write command and address outputted from the decoder 120A to the memory 108A. The data transmitter/receiver 118A outputs the data outputted from the decoder 120A to the memory 108A.

Upon receiving the write command outputted from the decoder 120A, the memory 108A writes the data outputted from the data transmitter/receiver 118A to the address outputted from the decoder 120A. Due to the system board 104, the data received from only one of the data crossbars may be written into both memories 108. Accordingly, data redundancy is realized.

Next, reading out data will be described. Here, description will be given of a situation where the data crossbar 112B connected to the memory controller 106B is broken. At the time of reading out data, an address and read command from another system board via the address crossbar 110 or an address and read command from the CPU 102 are inputted into the decoder 120 of each memory controller via the selector 125 and so forth.

Each decoder 120 outputs the read command and address to the command issuing unit 132. Each command issuing unit 132 outputs the read command and address outputted from the decoder 120 to the memory 108.

Upon receiving the read command outputted from the decoder 120, each memory 108 outputs the data stored in the address outputted from the decoder 120 to the data transmitter/receiver 118.

Each data transmitter/receiver 118 receives the data outputted from the memory 108. The data transmitter/receiver 118 outputs the data outputted from the memory 108 to the MRQ 95. The MRQ 95A of the memory controller 106A outputs the data outputted from the data transmitter/receiver 118 to the selector 126. Likewise, the MRQ 95B of the memory controller 106B outputs the data to the selector 127.

The selector 126 outputs the data outputted from the MRQ 95A to the selector 128. Likewise, the selector 127 outputs the data outputted from the MRQ 95B of the memory controller 106B to the selector 128.

The selector 128 detects, using an ECC, an error in the data outputted from the selector 126 and the data outputted from the selector 127. The selector 128 selects the data in which no error has been detected, and outputs the data to the CPU 102.

The CPU 102 receives the data outputted from the selector 128. When outputting the data to another system controller, the CPU 120 outputs the data to the selector 89A of the memory controller 106A via the selector 125. The selector 89A outputs the data outputted from the CPU 102 to the DXOQ 99A. The DXOQ 99A stores the data outputted from the selector 89A. The DXOQ 99A outputs the data stored therein to the other system board via the signal line 1121B.

Figure 4:
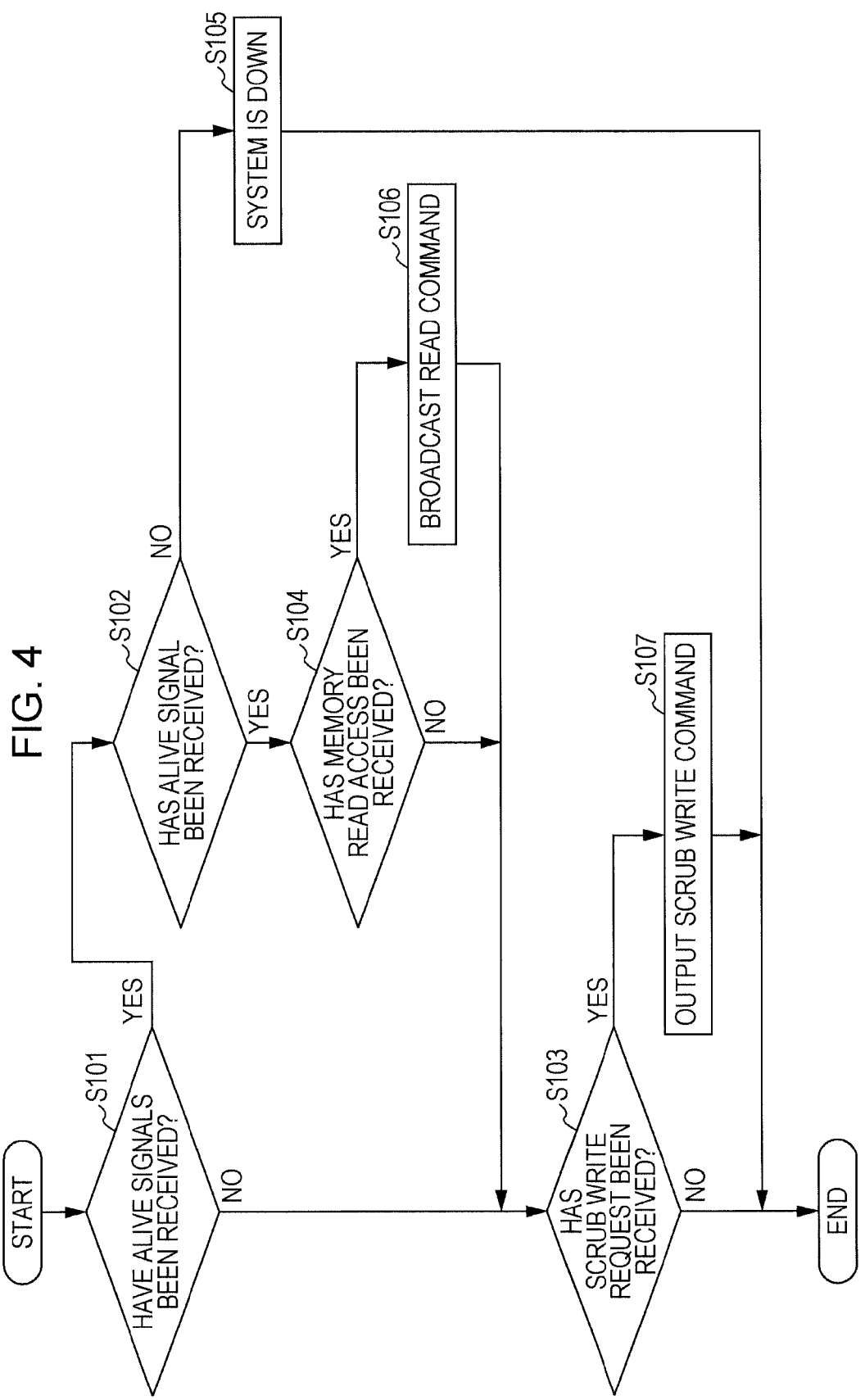
FIG. 4 is a flowchart illustrating the operation of a scrub control master circuit.

The process performed by the system controller 104 will be described with reference to FIG. 4. In S101, the system controller 104 determines whether or not alive signals have been received via the signal line 1111A and the signal line 1111B. If alive signals have been received via the signal line 1111A and the signal line 1111B, the process proceeds to S102. On the other hand, if an alive signal has not been received from any one of the signal line 1111A and the signal line 1111B, the process proceeds to S103.

In S102, the system controller 104 determines whether or not an alive signal has been received from any one of the signal line 1111A and the signal line 11116. If an alive signal has been received from any one of the signal line 1111A and the signal line 11116, the process proceeds to S104. On the other hand, if an alive signal has not been received from any of the signal line 1111A and the signal line 11116, the process proceeds to S105, and the system controller 104 determines that the system is down. The process ends.

In S104, the system controller 104 determines whether or not a memory read access has been received from another system board via the address crossbar 110. If the system controller 104 has received a memory read access from another system board, the process proceeds to S106. On the other hand, if the system controller 104 has not received a memory read access from another system board, the process proceeds to S103.

In S106, the system controller 104 broadcasts a received read command to the individual memory controllers in a dual configuration. The process proceeds to S103.

In S103, the system controller 104 determines whether or not a scrub write request has been received from the scrub control slave circuit 122. If a scrub write request has been received from the scrub control slave circuit 122, the process proceeds to S107. On the other hand, if a scrub write request has not been received from the scrub control slave circuit 122, the process ends.

In S107, the system controller 104 outputs a scrub write command to the individual memory controllers in a dual configuration. The process ends.

Figure 5:
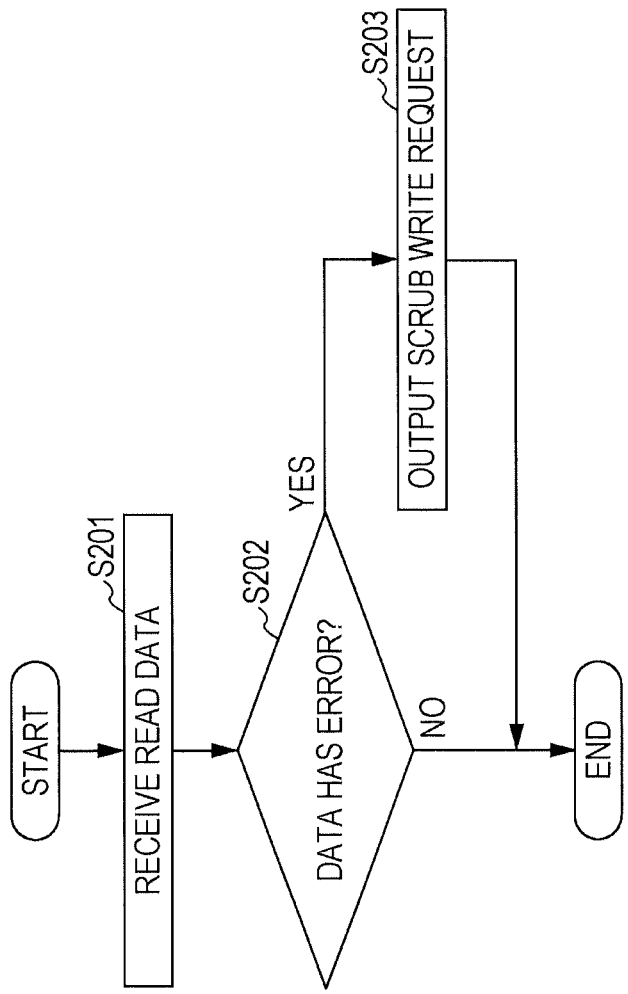
FIG. 5 is a flowchart illustrating the operation of a scrub control slave circuit.

The process performed by the memory controller 106A will be described with reference to FIG. 5. In S201, the memory controller 106A receives the data read out from the memory 108A by the data transmitter/receiver 118A via the MRQ 95A. The process proceeds to S202.

In S202, the memory controller 106A determines, using an ECC, whether or not the received data has an error. If the received data has an error, the process proceeds to S203. On the other hand, if the received data has no error, the process ends.

In S203, the memory controller 106A outputs a scrub request to the scrub control master circuit 130. The process ends.

Figure 6:
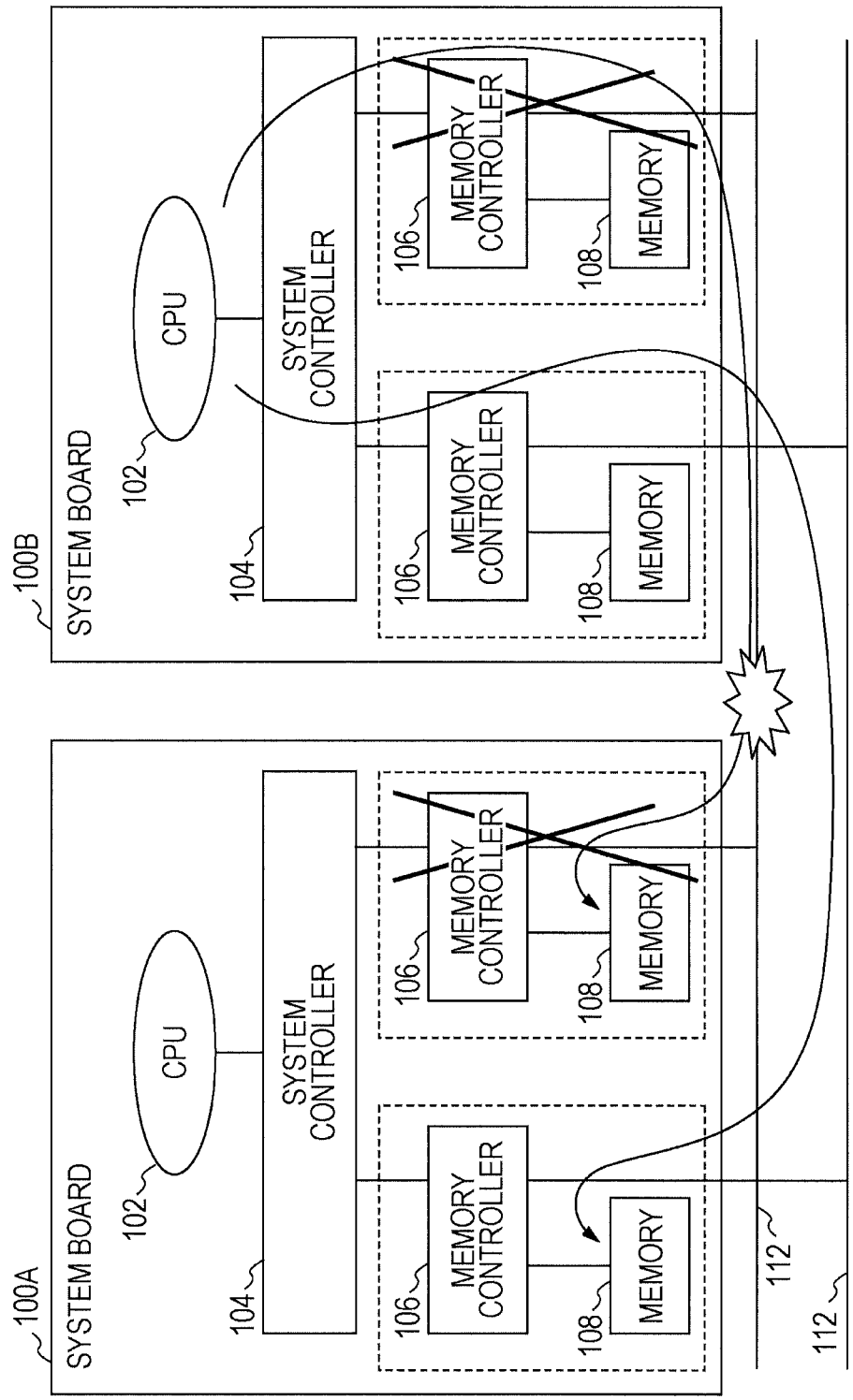
FIG. 6 is a first diagram illustrating an information processing apparatus.

The usefulness of this embodiment will be described. For example, the information processing apparatus illustrated in FIG. 6 is discussed. When one of the data crossbars 112 is broken and the memory system is performing a degraded operation, one of the memory controllers 106 and one of the memories 108 of the system board 100A stop operating. Thus, the memory controllers and the memories in a dual configuration on the same system board 100A do not operate in synchronization with each other.

Figure 7:
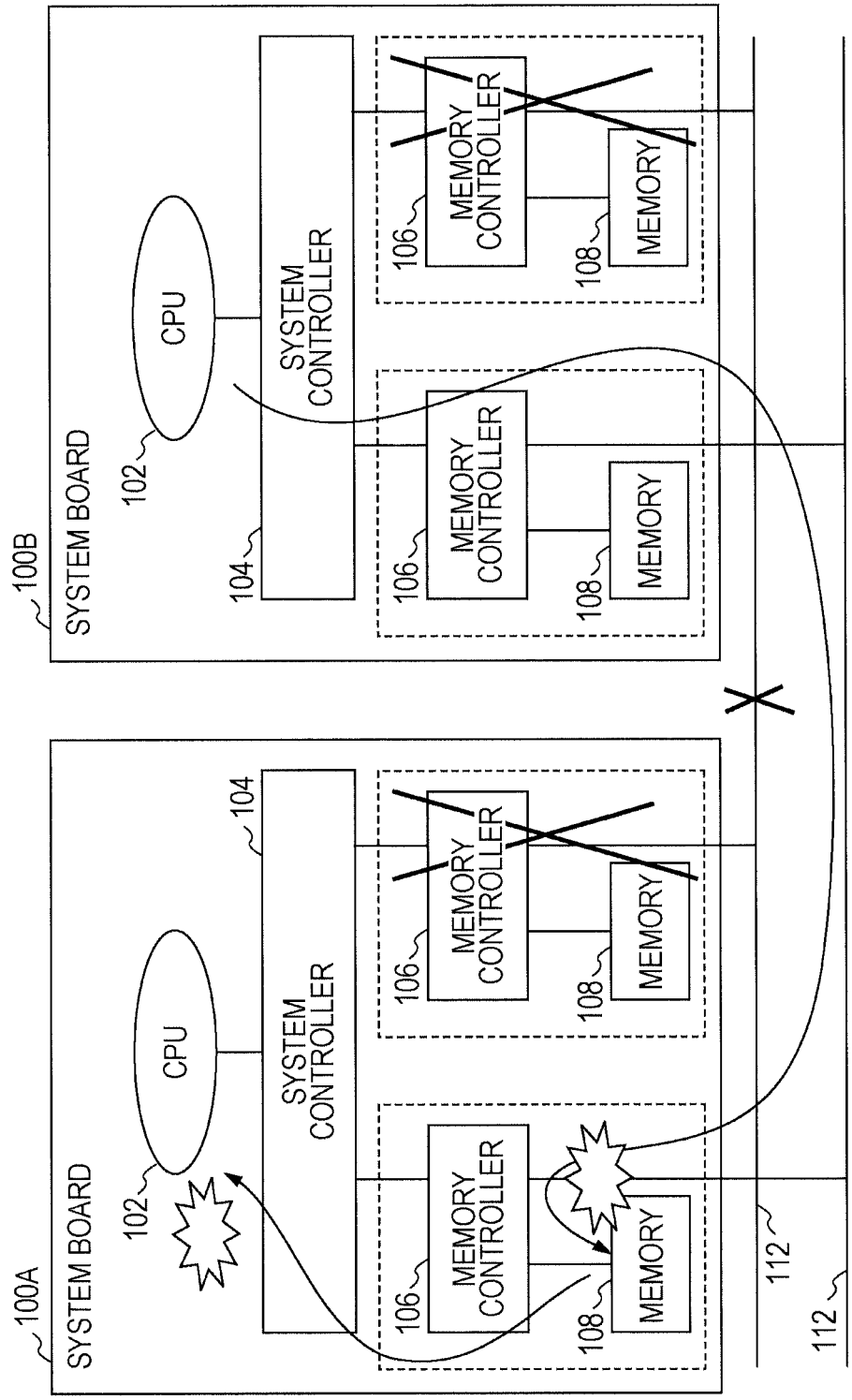
FIG. 7 is a second diagram illustrating an information processing apparatus.

Also, for example, the information processing apparatus illustrated in FIG. 7 is discussed. When one of the data crossbars 112 is broken and the memory system is performing a degraded operation, and when the data read out from the memory 108 by the operating memory controller 106 on the system board 100A has an uncorrectable error, the memory system stops.

Figure 8:
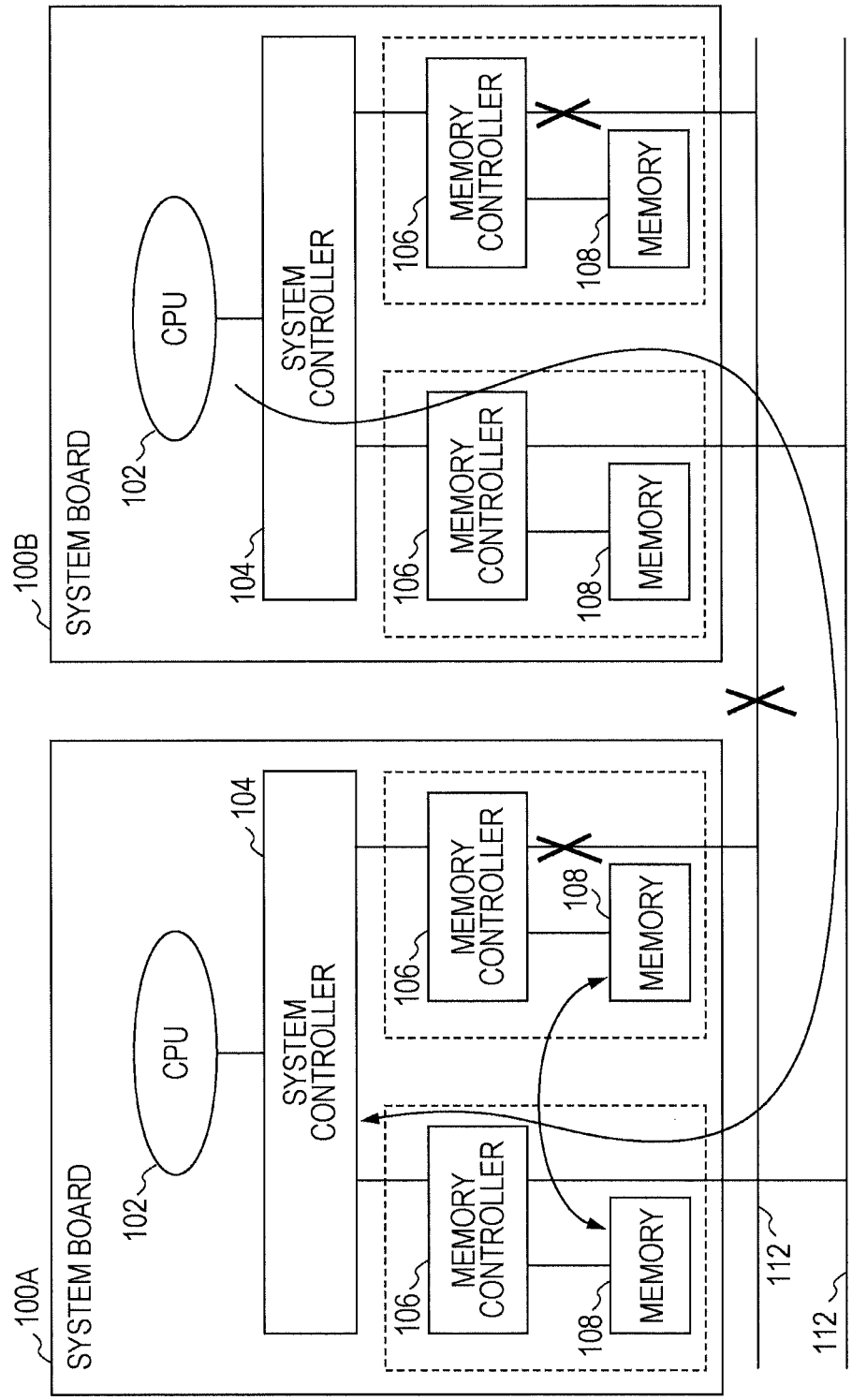
FIG. 8 is a diagram illustrating the usefulness of the embodiment.

According to this embodiment, as illustrated in FIG. 8, even when one of the data crossbars 112 is broken and the memory system is performing a degraded operation, the system controller 104 of the system board 100A reads out data from the individual memories 108 in a dual configuration. Therefore, even when any one of the pieces of read data has an uncorrectable error, if the other piece of data is normal or has a correctable error, system down may be suppressed by using the piece of data.

In this embodiment, a function of receiving an alive down signal and changing a path is added to the selector 88 and the selector 89 of the memory controller 106. If degradation occurs due to the breakdown of the data crossbar 112, a process is not completed by the memory controller, but the process is performed via the scrub control master circuit 130 of the system controller 104. A return path from the memory controller 106 is provided to the scrub control master circuit 130. The selector 128 performs return of data from the memory controller 106 to the scrub control master circuit 130. A memory access conversion function is added to the scrub control master circuit 130. Memory write via a return path is converted to memory write 2, and memory read via a return path is converted to memory read 2. The conversion is effective when an alive down signal is received. The scrub control master circuit 130 is allowed to issue a command of a result of the conversion. A function of decoding memory write 2 and memory read 2 is provided to the command issuing unit in the memory controller 106. Normally, memory access via a data crossbar is directly performed on a memory from a memory controller. If only data crossbars are to be degraded to effectively utilize a memory system, it is necessary to create a semblance that a degraded data crossbar unit is operating. The target of semblance is a memory controller.

According to an aspect of the embodiment, during a degraded operation of data crossbars in a dual configuration, a system controller reads out data from a first memory and a second memory. Even when the data read out from one of the memories has an uncorrectable error, if the data read out from the other memory has no error or has a correctable error, the data is output. Accordingly, the reliability of data may be increased when the data is transferred during a degraded operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A memory system that is connectable to another apparatus via a data crossbar and that stores data, the memory system comprising:
   a first memory that stores data;
   a second memory that forms a dual configuration together with the first memory and that stores data;
   a first memory controller that writes data into or reads out data from the first memory, that is connected to another apparatus via a first data crossbar, and that transmits or receives data to be written into the first memory or data read out from the first memory to or from the other apparatus;

a second memory controller that writes data into or reads out data from the second memory, that is connected to the other apparatus via a second data crossbar, and that transmits or receives data to be written into the second memory or data read out from the second memory to or from the other apparatus; and a system controller that detects transmission or reception of data performed via the first data crossbar and the second data crossbar, that instructs the first memory controller and the second memory controller to read out, from the first memory and the second memory, data requested to be read out by the other apparatus if the system controller detects that any one of the first data crossbar and the second data crossbar being not capable of transmitting or receiving data, that performs error detection on data read out by the first memory controller and the second memory controller, and that outputs data in which no error has been detected or data in which an error has been corrected.

2. The memory system according to claim 1, further comprising:

a processing unit that processes data, wherein the system controller outputs, to the processing unit, the data in which no error has been detected or the data in which an error has been corrected.

3. The memory system according to claim 2, wherein the processing unit transmits the data outputted from the system controller to the other apparatus via a data crossbar capable of transmitting data.

4. A method for controlling a memory system that is connectable to another apparatus via a data crossbar and that stores data, the method comprising:

transmitting or receiving, with a first memory controller that is connected to the other apparatus via a first data crossbar and that writes data to or reads out data from a first memory, data to be written to the first memory or data read out from the first memory;

transmitting or receiving, with a second memory controller that is connected to the other apparatus via a second data crossbar and that writes data to or reads out data from a second memory, data to be written to the second memory or data read out from the second memory; and detecting, with a system controller connected to the first memory controller and the second memory controller, transmission or reception of data performed via the first data crossbar and the second data crossbar, reading out from the first memory and the second memory, with the system controller, data requested to be read out by the other apparatus if the system controller detects that any one of the first data crossbar and the second data crossbar being not capable of transmitting or receiving data, performing, with the system controller, error detection on the read out data, and outputting, with the system controller, data in which no error has been detected or data in which an error has been corrected.

5. The method for controlling a memory system according to claim 4, wherein the memory system further includes a processing unit that processes data, and wherein the system controller outputs the data in which no error has been detected or the data in which an error has been corrected.

6. The method for controlling a memory system according to claim 5, wherein the processing unit transmits the data outputted from the system controller to the other apparatus via a data crossbar capable of transmitting data.

* * * * *